(12) United States Patent
Pépin et al.

(10) Patent No.: US 8,049,991 B2
(45) Date of Patent: Nov. 1, 2011

(54) DIGITAL AUDIO BOOK CARTRIDGE AND PLAYER WITH MANIPULATION-FACILITATING FEATURES

(76) Inventors: Gilles Pépin, St-Charles de Drummondville (CA); Alain Pare, Kirkland (CA); Dominic R. Labbé, McMasterville (CA); Gerard M. Chevalier, Edmonton (CA); Thomas D. Haubert, Columbus, OH (US); Joseph A. Juratovac, Columbus, OH (US); Jeffrey R. Held, Columbus, OH (US); Jeffrey Michael Witt, Baltimore, MD (US); Gregg Charles Vanderheiden, Madison, WI (US); David Paul Kelso, Madison, WI (US); Frank Kurt Cylke, Great Falls, VA (US); Jean Marie Moss, Glendale, MD (US); Michael Gilbert Katzmann, Washington, DC (US); Robert Edward Fistick, Charlotte Hall, MD (US); Michael Montfort Moodie, Bethesda, MA (US); Alice Kathryn Baker, Washington, DC (US)

( * ) Notice: Subject to any disclaimer, the term of this patent is extended or adjusted under 35 U.S.C. 154(b) by 987 days.

(21) Appl. No.: 11/857,582

(22) Filed: Sep. 19, 2007

(65) Prior Publication Data
US 2008/0175122 A1    Jul. 24, 2008

Related U.S. Application Data

(60) Provisional application No. 60/845,763, filed on Sep. 20, 2006.

(51) Int. Cl.
*G11B 23/087* (2006.01)
(52) U.S. Cl. ...................................................... 360/132
(58) Field of Classification Search ................... 360/132
See application file for complete search history.

(56) References Cited

U.S. PATENT DOCUMENTS

| | | | | |
|---|---|---|---|---|
| 6,385,004 | B1 * | 5/2002 | Sanpei et al. | 360/96.51 |
| 6,769,989 | B2 * | 8/2004 | Smith et al. | 463/41 |
| 6,788,487 | B2 * | 9/2004 | Unno | 360/72.1 |
| 7,126,770 | B1 * | 10/2006 | Arai et al. | 360/8 |
| 7,377,460 | B2 * | 5/2008 | Amano et al. | 242/344 |

* cited by examiner

*Primary Examiner* — Mark Blouin
(74) *Attorney, Agent, or Firm* — Myers Bigel Sibley & Sajovec, PA

(57) ABSTRACT

A cartridge for use by print-disabled users to play digital audio content and a player having a receptacle for receiving the cartridge are provided. The cartridge includes a random-access digital storage device storing the digital audio content and having a connector providing access to the digital audio content; and a casing permanently housing the digital storage device and allowing access to the connector of the digital storage device. The casing has a form facilitating handling of the cartridge by the print-disabled users which includes bevelled edges, and has dimensions comparable to dimensions of a standard compact audio cassette. Preferably, the cartridge has a hole extending through the casing at its back end and a sloped surface on the bottom side of the casing at the back end. The receptacle has a form and shape facilitating insertion of the cartridge therein. It has a lower surface defining an elevated ramp along which the cartridge slides as it is inserted into the player.

25 Claims, 15 Drawing Sheets

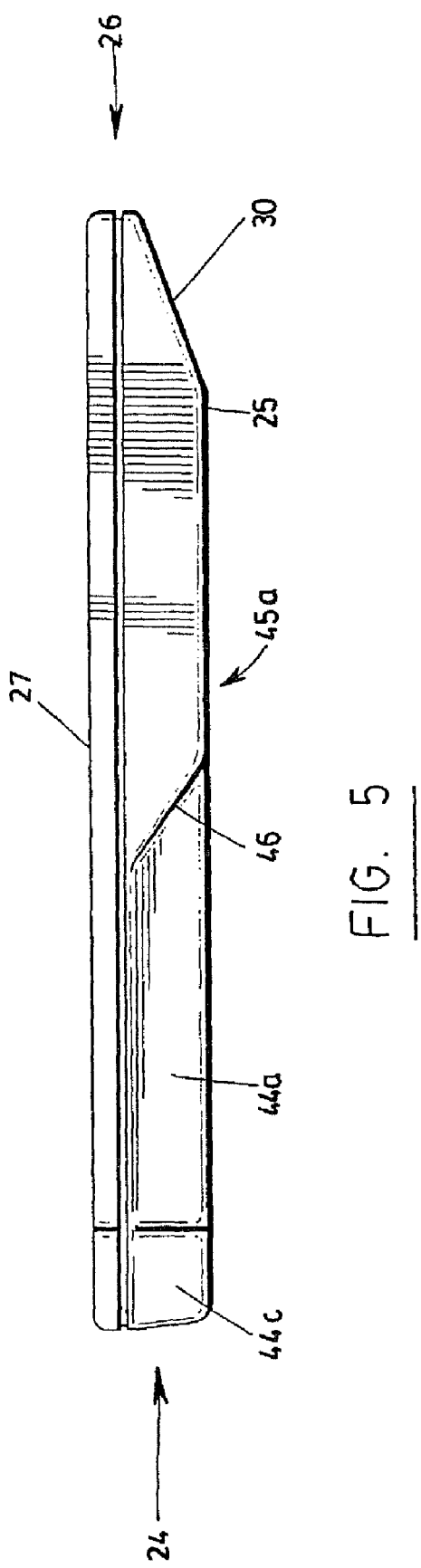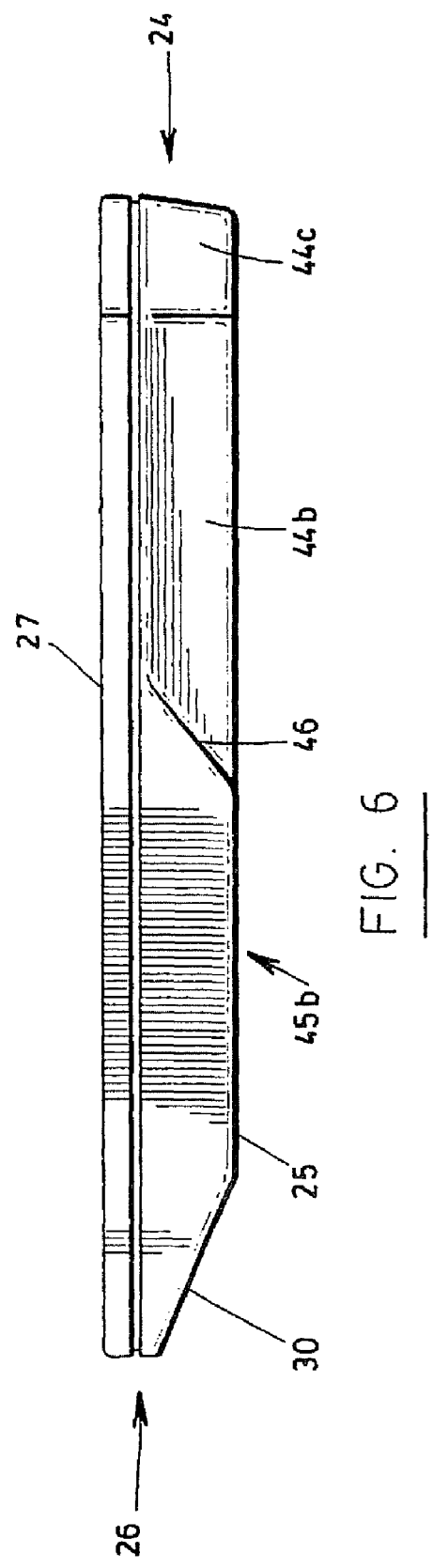

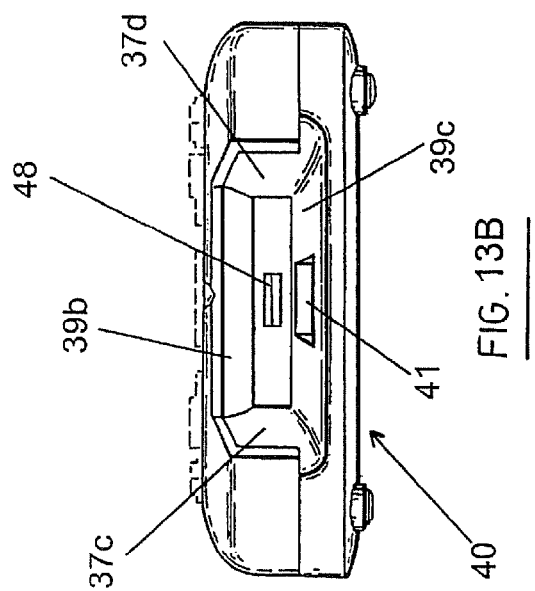
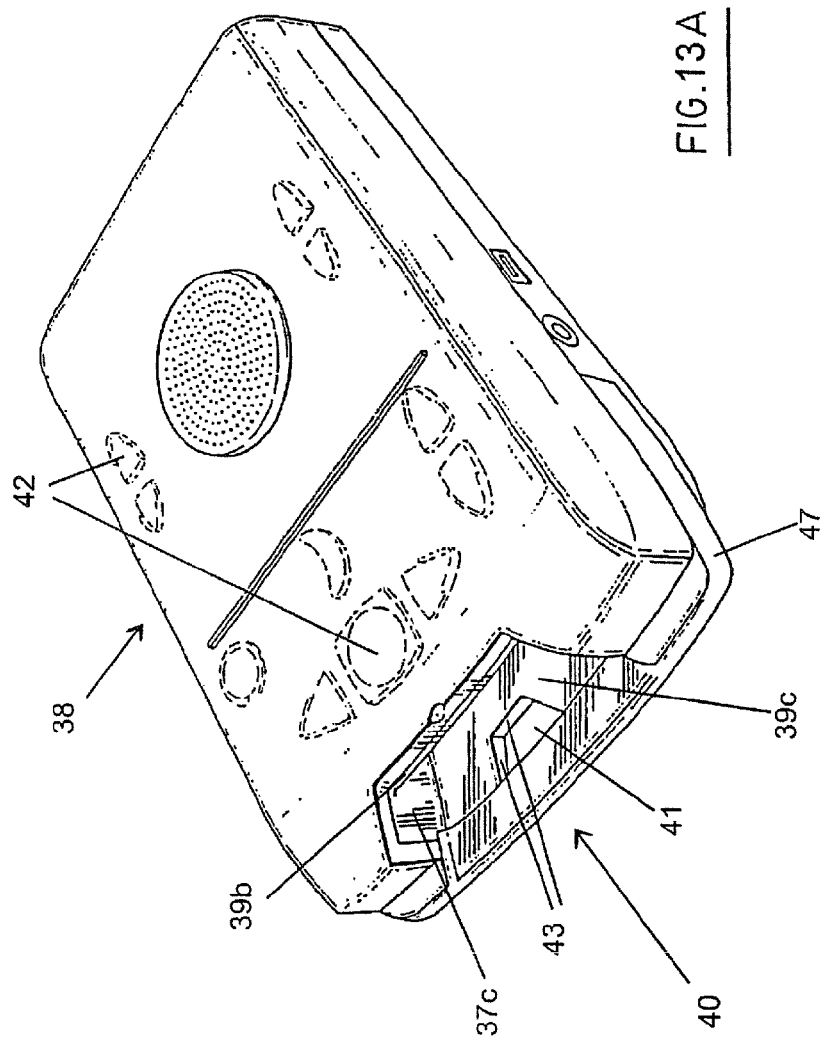

DIGITAL AUDIO BOOK CARTRIDGE AND PLAYER WITH MANIPULATION-FACILITATING FEATURES

CROSS-REFERENCE TO RELATED APPLICATIONS

This application claims priority to U.S. Provisional Application Ser. No. 60/845,763, filed Sep. 20, 2006, the disclosure of which is incorporated by reference in its entirety.

RIGHTS IN THE INVENTION

This invention was made, in part, with funding from the United States Government under Award No. GS-23F-0011L and, accordingly, the United States Government may have certain rights in this invention.

FIELD OF THE INVENTION

The present invention relates to the field of audio books and more particularly concerns a digital audio cartridge and a player both provided with features facilitating their use by a visually impaired, physically disabled or learning disabled user.

BACKGROUND OF THE INVENTION

"Audio" or "talking" books are an important alternative format to print for providing access to books of all types for print-disabled persons who cannot read conventional print books due to a visual, physical or learning disability.

An audio or talking book is typically created in the following way: the contents of a print document, in its entirety or abridge, is usually read by a professional or a volunteer and recorded on a medium appropriate for distribution, such as a tape cassette or a CD.

With recent improvements in digital memory devices, the audio book industry now uses low cost digital media such as Flash memory devices for storing their products. For example, international patent application published under no. WO 2004/080150 describes a book reading apparatus which is able to receive audio files either through a wireless connection or through a standard digital memory device such as a compact flash card. The use of "off-the-shelf" memory cards is also disclosed in U.S. Pat. No. 5,475,399 (BORSUK) and published U.S. patent application No. US 2006/0069456 (STRINGER et al.).

Alternatively, published U.S. patent application No. US 2005/0276570 (REED Jr. et al.) discloses an audio book system wherein the digital book recordings are provided on a memory card shaped and sized as a credit card. A player with a suitably-sized slot is provided for reading these cards.

As mentioned above, recorded audio books are often used by individuals who either cannot read traditional printed books due to a visual impairment or learning disability or cannot manipulate paper documents due to physical disabilities. A significant issue for these readers of digital audio books is the manipulation of standard digital storage media. Such media are usually small in size, with a length and width of the order of a few centimeters and can be as thin as 1 mm in thickness. They can be very difficult to locate and handle for visually impaired users, and the absence of tactile markings complicates their proper insertion into a corresponding player. For a physically disabled user, picking up a standard digital memory card and inserting it in a player can be impossible.

There is therefore a need for a digital audio book player system adapted for use by visually impaired, physically disabled or learning disabled users or the like.

SUMMARY OF THE INVENTION

In accordance with a first aspect of the present invention, there is provided a cartridge for use by print-disabled users to play digital audio content. The cartridge includes: a random-access digital storage device storing the digital audio content, the digital storage device having a connector providing access to the digital audio content; and a casing permanently housing the digital storage device and having a form facilitating handling of the cartridge by the print-disabled users. The casing has dimensions comparable to dimensions of a standard compact audio cassette and has a front end, a back end opposite the front end, a first lateral side, a second lateral side opposite the first lateral side, a top side and a bottom side opposite the top side, the casing allowing access to the connector of the digital storage device.

Preferably, the digital storage device has a hole extending from the top side through to the bottom side, the hole being located proximate the back end of the casing.

Preferably, the back end of the casing includes a sloped surface on the bottom side of the casing.

Also preferably, at least one of the first lateral side and the second lateral side includes a bevelled lateral edge extending part way along the top side or bottom side of the casing.

The front end of the casing may be tapered laterally.

The top side of the casing may be provided with a ridge thereon defining a label-receiving area, the label-receiving area being adapted to receive a label associated with the digital audio content.

In accordance with a second aspect of the invention, there is provided a cartridge for use by print disabled users to play digital audio content. The cartridge includes: a random-access digital storage device storing the digital audio content, the digital storage device having a connector providing access to the digital audio content; and a casing permanently housing the digital storage device and having a form facilitating handling of the cartridge by the print-disabled users. The casing allows access to the connector of the digital storage device. The casing includes:
  a top side;
  a bottom side opposite the top side;
  a first lateral side;
  a second lateral side opposite the first lateral side, at least one of the first and second sides including a bevelled lateral edge which extends part way along the bottom side or top side of the casing;
  a front end; and
  a back end opposite the front end, the back end comprising a sloped surface on the bottom side of the casing.

The casing has a hole extending from the top side through to the bottom side, the hole being located proximate the back end of the casing.

In accordance with a third aspect of the invention, there is provided a cartridge for use by print-disabled users to play digital audio content in an audio book player having a receptacle for receiving the cartridge, the receptacle having a lower surface defining an elevated ramp. The cartridge includes: a random-access digital storage device storing the digital audio content, the digital storage device having a connector providing access to the digital audio content; and a casing permanently housing the digital storage device and having a form facilitating handling of said cartridge by the print-disabled users. The casing has dimensions comparable to dimensions of a standard compact audio cassette and has a front end, a back end opposite the front end, a first lateral side, a second lateral side opposite the first lateral side, a top side and a bottom side opposite the top side. The casing allows access to the connector of the digital storage device at the front end thereof. The back end of the casing includes a sloped surface on the bottom side of the casing, the sloped surface being angled so that when the cartridge rests on the sloped surface of the casing, the bottom side at the front end of the casing rests on the elevated ramp for slidably inserting the cartridge into the receptacle.

Preferably, the sloped surface of the casing of the cartridge is inclined at an angle substantially matching an angle of the elevated ramp of the receptacle of the audio book player.

In accordance with a fourth aspect of the invention, there is provided an audio book player for playing digital audio content from a cartridge for use by print-disabled users, the cartridge including a random-access digital storage device storing the digital audio content, the digital storage device having a connector providing access to the digital audio content, and a casing permanently housing the digital storage device and having a form facilitating handling of the cartridge by the print-disabled users, the casing having a front end, a back end opposite the front end, a first side, a second side opposite the first side, a top side and a bottom side opposite the top side, wherein the back end of the casing includes a sloped surface on the bottom side of the casing, the casing allowing access to the connector of the digital storage device. The audio book player includes:

a receptacle for receiving the cartridge, the receptacle comprising:
an open front end;
a closed back end opposite the open front end, the closed back end comprising a mating connector for connecting to the connector of the digital storage device of the cartridge;
a first lateral surface;
a second lateral surface opposite the first lateral surface;
an upper surface; and
a lower surface opposite the upper surface, the lower surface defining an elevated ramp, the elevated ramp being angled and of a height so that when the cartridge rests on the sloped surface of the casing, the bottom side at the front end of the casing rests on the elevated ramp of the receptacle of the audio book player for slidably inserting the cartridge into the receptacle.

Preferably, the elevated ramp is inclined at an angle substantially matching an angle of the sloped surface of the casing.

The receptacle may have a funnel shape for guiding the cartridge therein.

Preferably, the first lateral surface and second lateral surface of the receptacle receivingly match bevelled lateral edges of the cartridge.

The receptacle may include abutment means for impeding further insertion of the cartridge into the receptacle.

The lower surface proximate the open front end may include a recess therein for receiving a tool used by print-disabled users.

Other features and advantages of the present invention will be better understood upon reading of preferred embodiments thereof with reference to the appended drawings.

BRIEF DESCRIPTION OF THE DRAWINGS

FIG. 5 is a left side plan view of the cartridge in FIG. 1.

FIG. 6 is a right side plan view of the cartridge in FIG. 1.

FIG. 13A is a perspective view of a player according to an embodiment of the invention.

FIG. 13B is a front view of the player of FIG. 13A.

DESCRIPTION OF PREFERRED EMBODIMENTS OF THE INVENTION

Figure 1:
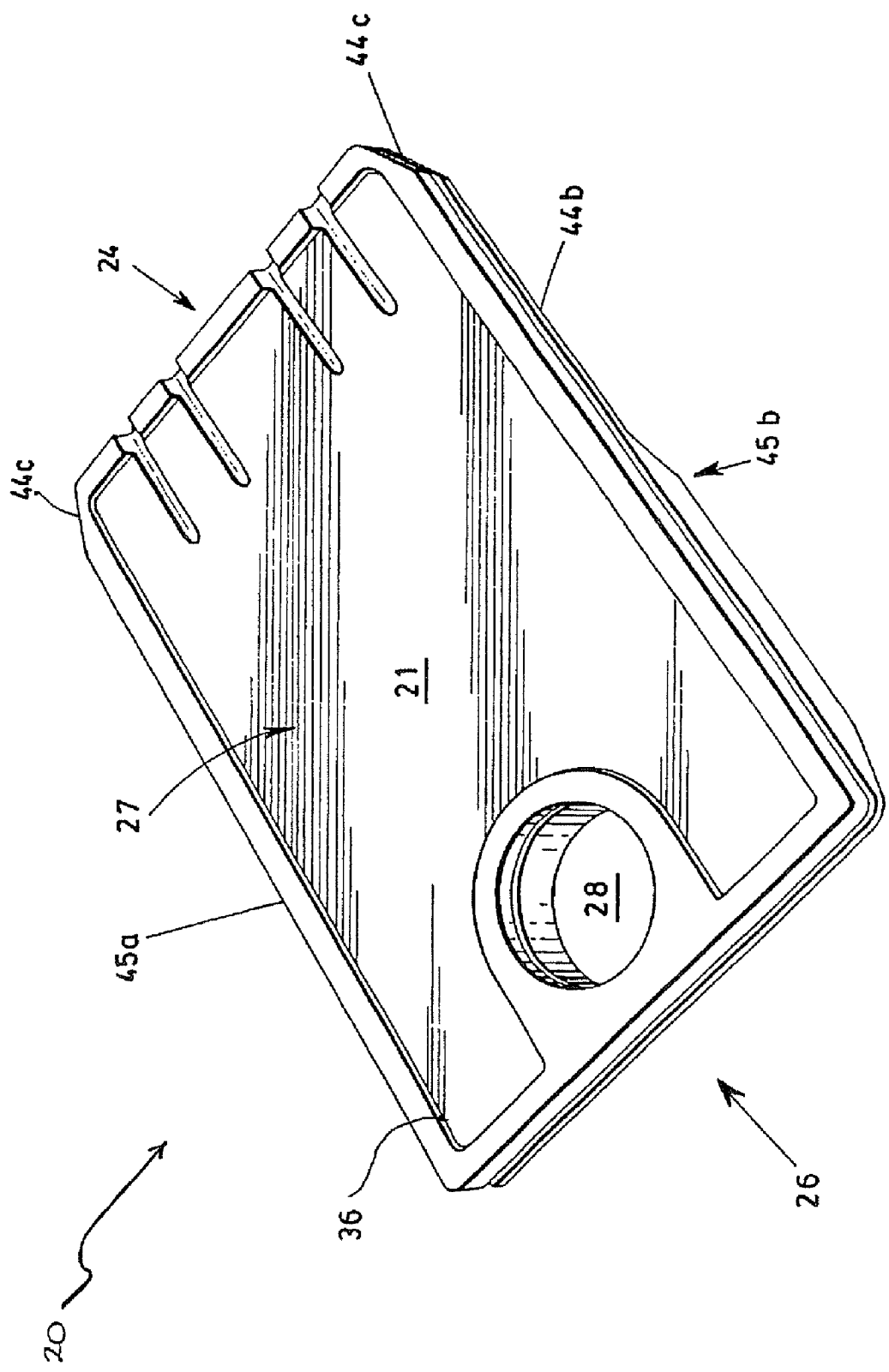
FIG. 1 is a perspective top view of a cartridge according to an embodiment of the invention.

The present invention will be described herein below in conjunction with the drawings in FIGS. 1 to 13B, wherein like reference numerals refer to like elements throughout.

The present invention concerns a cartridge and player system for playing digital audio content. Digital audio content refers to data in a digital format corresponding to audio signals, and includes any voice or audio recording appropriate for distribution through such a cartridge and player system. For example, and not exhaustively, the recorded information may be a literary work, reference work, school book, children's book, non-fiction book, compilation, newspaper or magazine articles, or even music, radio recording, video, text, maps, biometric data, or other types of recorded audio material, herein and generally referred to as audio books. The digital format may include any number of formats, for example AMR-WB+, 3gp, wav, mp3, Ogg Vorbis, Daisy, and AINSI/NISO Z39.86 etc, be it an accepted universal standard format or an application specific format. The recording may have been created by any appropriate technique known in the art, such as for example recording an audio file using a Text-To-Speech (TTS) input, or rendering of text files using a TTS engine embedded in the player.

The present invention is particularly directed to facilitating the use of this system by users which are either visually impaired, learning disabled or have one or more physical disabilities. This group will be collectively referred to hereinafter as "print-disabled users" and includes blind or low vision users, users with learning disabilities and/or cognitive difficulties, users with a physical disability preventing or impairing the use of their hands, users with arthritis, elderly users, users with cerebral palsy, users with multiple sclerosis, etc. It will be understood by one skilled in the art that this list is non-exhaustive and that a given print-disabled user may be affected by one or a combination of the disadvantages listed above or other disadvantages.

Referring to FIGS. 1 to 9A, 10A and 10B, there is shown a cartridge 20 for use by print-disabled users to play digital audio content according to a preferred embodiment of the invention.

The cartridge is preferably made of plastic or other appropriate material resistant to shock and breakage. The cartridge includes a random-access digital storage device on which is stored the digital audio content and a casing 21 permanently housing the digital storage device.

Figure 2:
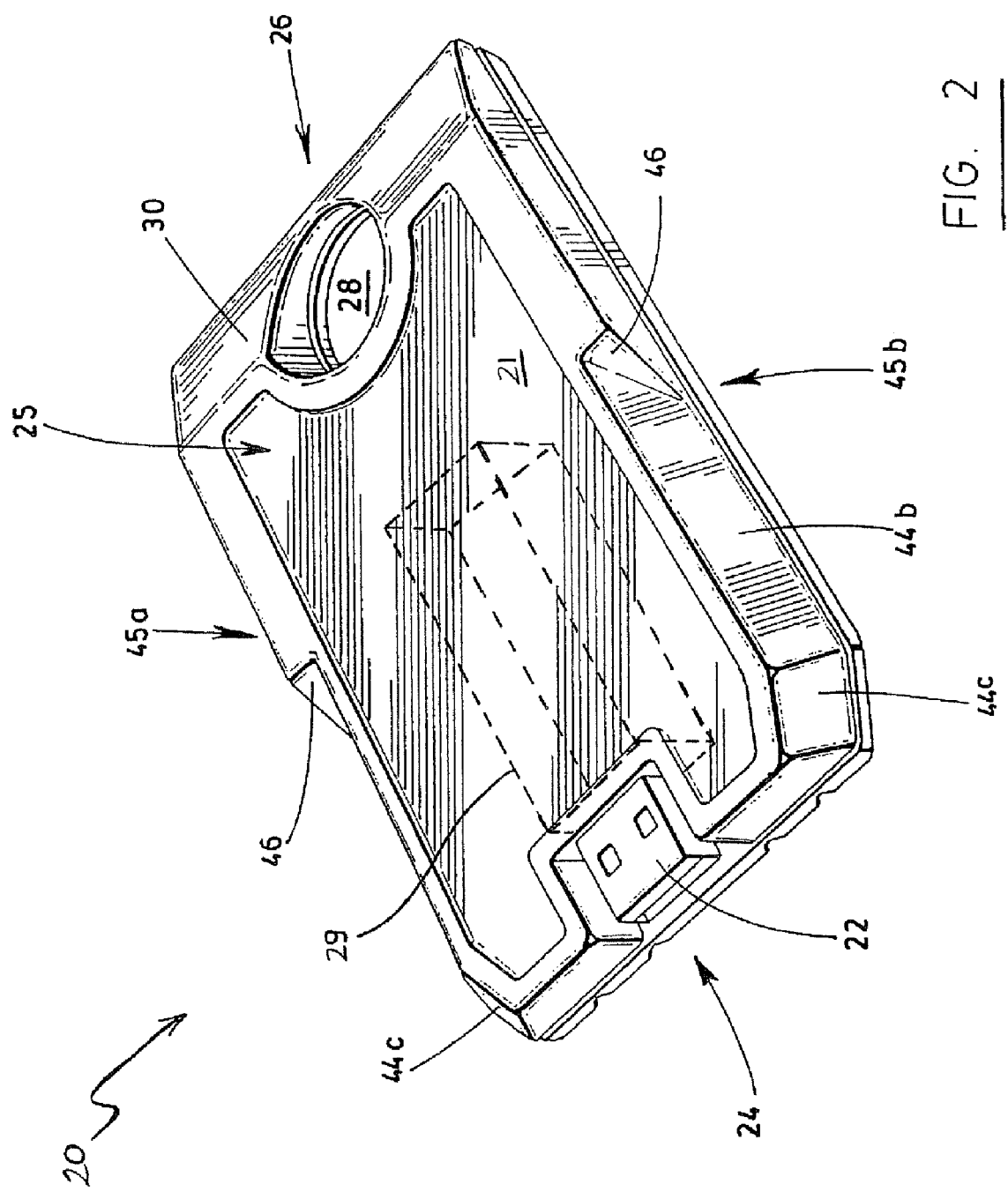
FIG. 2 is a perspective bottom view of the cartridge in FIG. 1, showing the digital storage device in phantom line.
Figure 3:
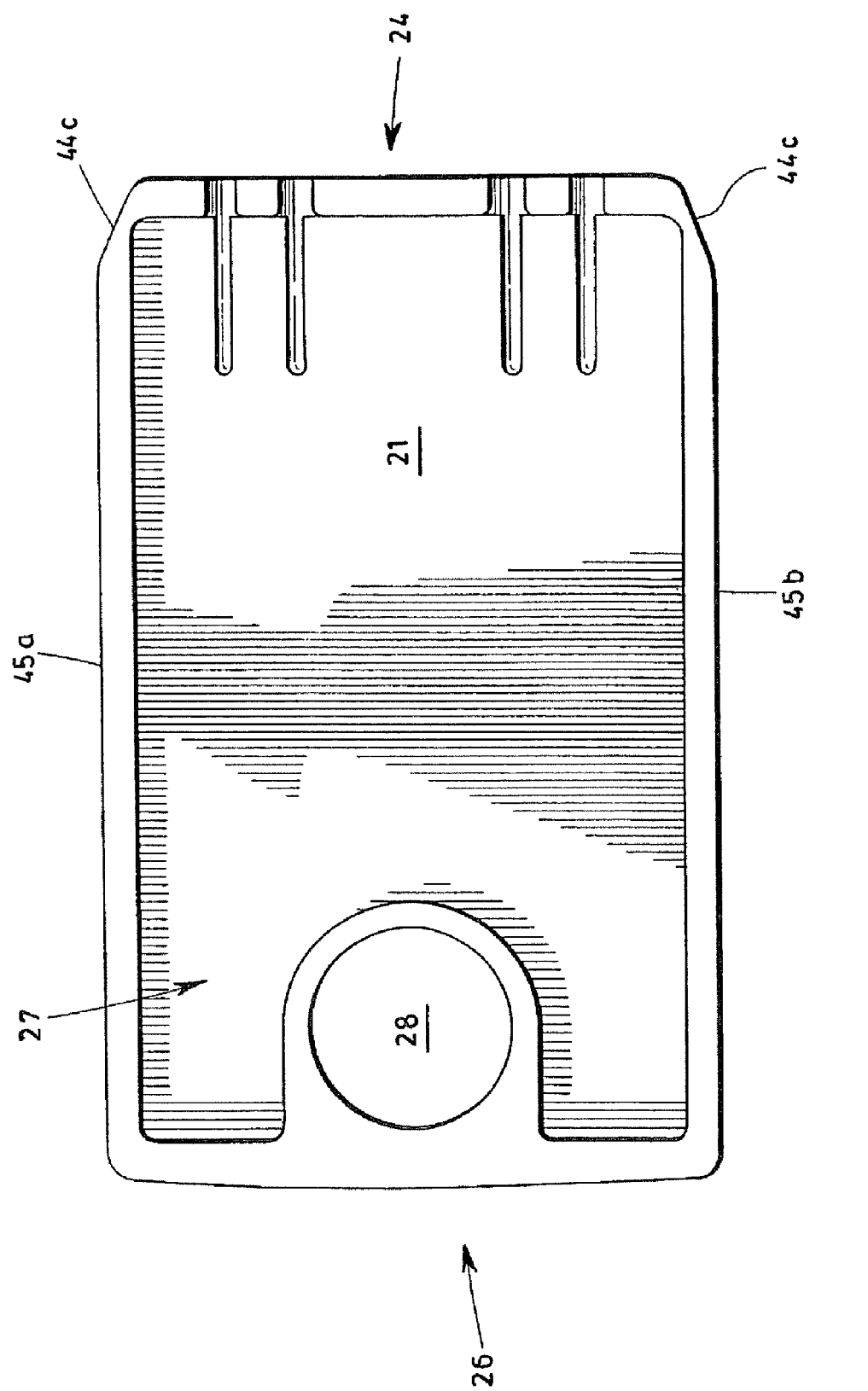
FIG. 3 is a top plan view of the cartridge in FIG. 1.
Figure 4:
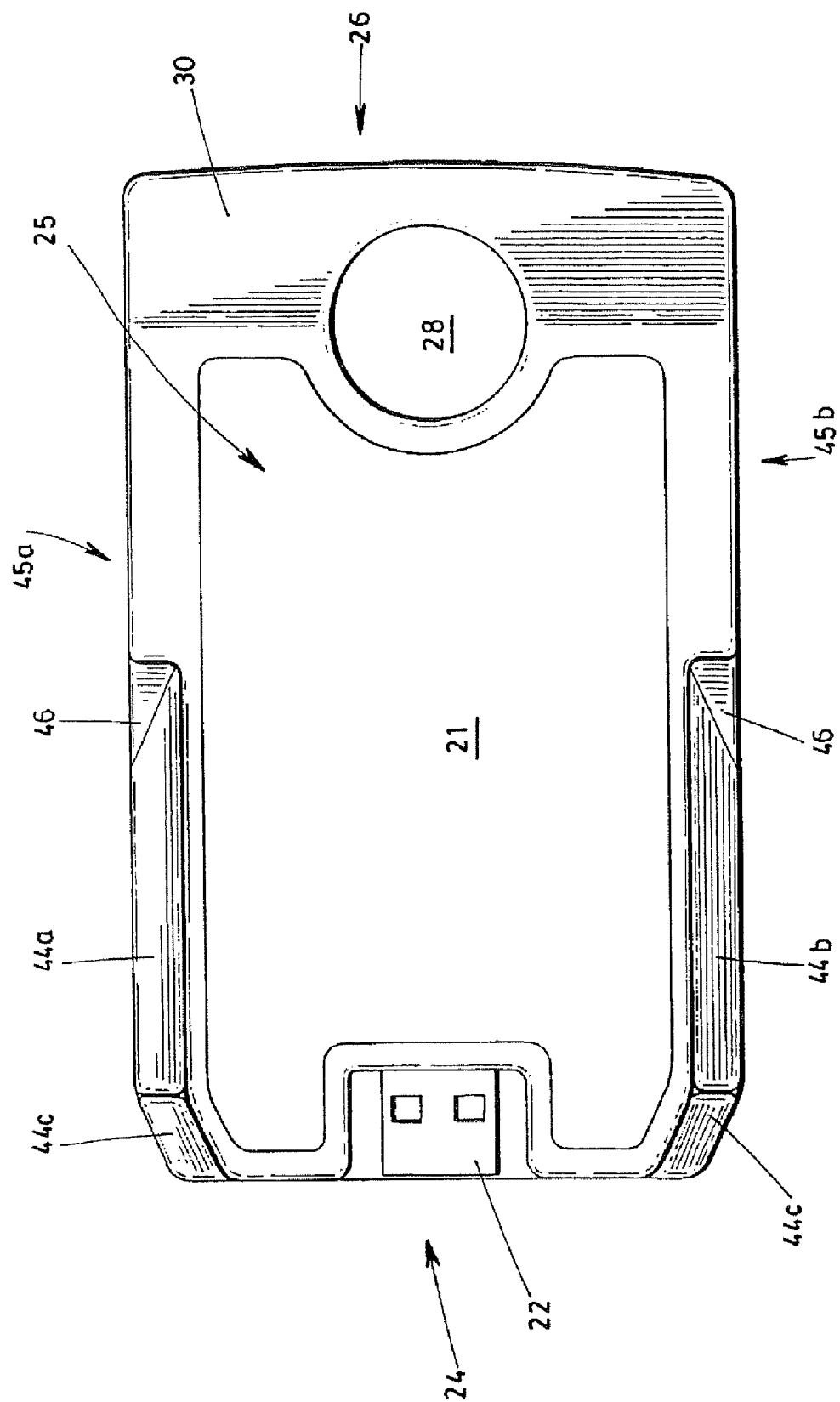
FIG. 4 is a bottom plan view of the cartridge in FIG. 1.
Figure 7:
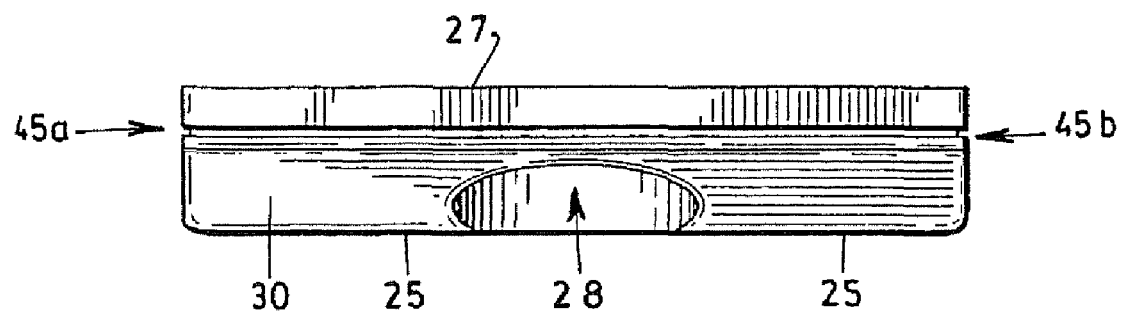
FIG. 7 is a front view of the cartridge of FIG. 1.
Figure 8:
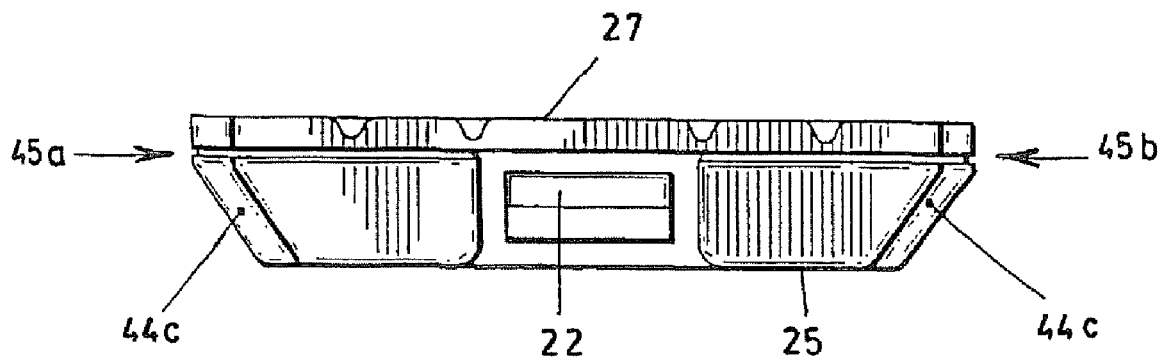
FIG. 8 is a rear view of the cartridge of FIG. 1.

The digital storage device 29, shown in phantom line in FIG. 2, is practically completely housed within the casing 21 of the cartridge 20 and cannot be removed from the casing 21 by the user. Preferably, the digital storage device is a random-access device that is resistant to kinetic and electric shock. Because flash memory is non-volatile and can be electrically erased and reprogrammed, the data storage device may include flash memory. Appropriate digital storage devices may include a USB flash drive or a memory card. The digital storage device 29 has a connector 22 providing access to the digital audio content stored therein. The connector may be used to connect the digital storage device to a mating connector of the audio book player when the cartridge is inserted therein or to a mating connector associated with any appropriate reader, for example a mating connector associated with a computer. In the preferred embodiment of the invention, the connector 22 is a standard Type A USB male connector, but as mentioned other types of connections may be considered without departing from the scope of the present invention.

Figure 9A:
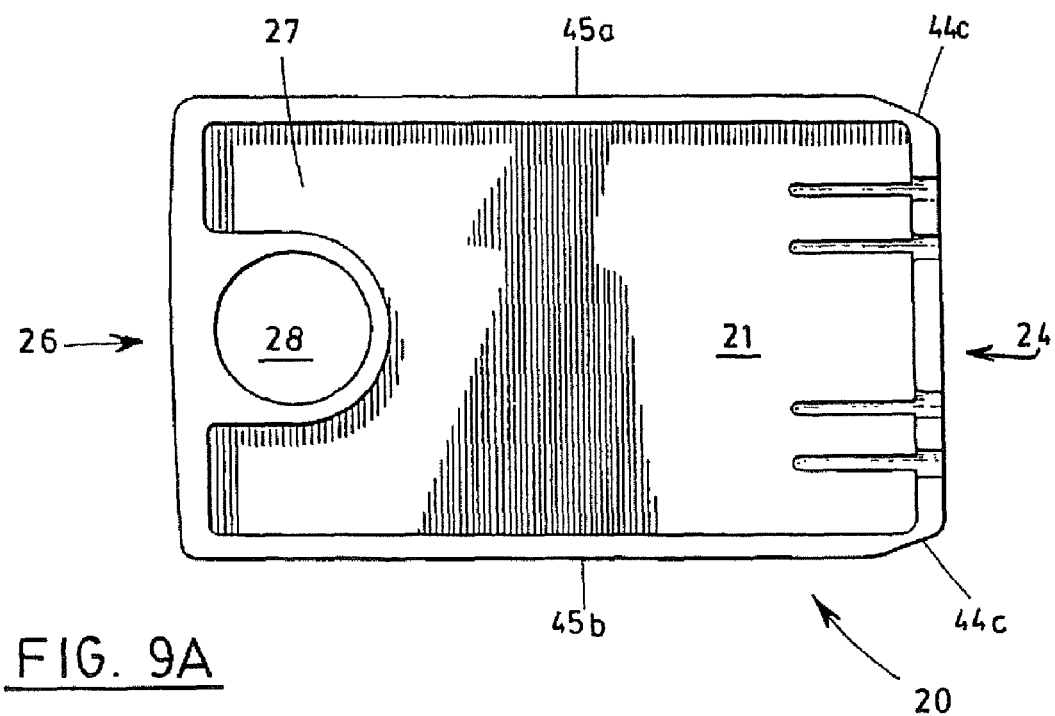
FIG. 9A is a top view of the cartridge of FIG. 1.
Figure 9B:
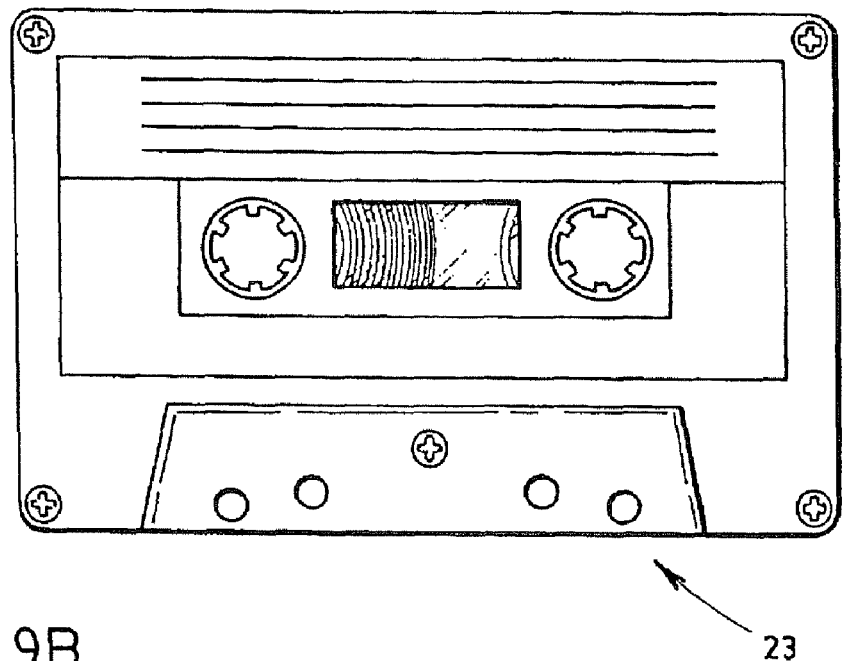
FIG. 9B is a top view of a standard audio compact cassette.

The cartridge 20 is sized and shaped to facilitate its handling by the print-disabled users. It will be understood by one skilled in the art that, in the present context, the expressions "handling" or "manipulating" do not necessarily refer to the use of one's hands, as some print-disabled users are unable to use their hands and may use their feet or intermediary devices such as mouth sticks to move objects. As such, the dimensions of the cartridge are selected so that the cartridge can be easily manipulated using only one hand. The dimensions of the casing may be approximately 9.5 cm by 5.7 cm by 1.0 cm. Of course, it is understood that these dimensions are outer dimensions and do not necessarily designate a perfect rectangular form to the cartridge. Moreover, the dimensions of the casing 21 of the cartridge are comparable to dimensions of a standard audio compact cassette 23, as seen from FIGS. 9A and 9B), that is to say that the dimensions of the casing 21 are similar but not necessarily identical to those of a standard audio compact cassette 23. A standard audio compact cassette is also often referred to as an audio cassette, a cassette tape, a cassette or simply a tape. The standard audio compact cassette is the typical cassette housing a magnetic tape passed and wound around two miniature spools with which many are familiar (as shown in FIG. 9B). In fact, the dimensions of the present cartridge are comparable to those of the standard audio cassette so as to breed familiarity and facilitate its use by the print-disabled user accustomed to using audio tape players.

The casing 21 of the cartridge 20 has a front end 24 designed to be inserted into a receptacle of the player, a back end 26 opposite the front end 24, a first lateral side 45a, a second lateral side 45b opposite the first lateral side 45a, a top side 27 and a bottom side 25 opposite the top side 27. The male USB connector 22 is accessed preferably from the front end 24 of the casing 21. As can be seen in FIG. 2, the connector 22 is preferably recessed in the casing 21 of the cartridge 20, ensuring a better protection from accidental breakage and preventing insertion in other standard female connectors of the player itself or of other equipment such as Personal Computers (PC). It will be noticed however that if desired, the cartridge could be connected to a PC through the use of a USB cable or other appropriate connecting device.

A hole 28 extends transversally through the casing, from the top side through to the bottom side proximate its back end 26, as most clearly seen in FIGS. 1 to 4, 5, 9A, 10A and 10B. The hole 28 is large enough to receive a finger or object such as a mouth stick as used by print-disabled users who do not have the use of their hands. This hole 28 therefore serves the dual purpose of allowing the insertion and removal of the cartridge 20 by various users, and of allowing identification of the back end 26 of the casing 21, both visually and through manipulation thereof.

In addition, the back end 26 of the casing 21 includes a sloped surface 30 on the bottom side 25 of the casing 21, so that by pressing down on the back end 26 of the casing 21, the front end 24 of the casing is angled upwards which facilitates its positioning for insertion in the player. This feature will be explained further herein below with reference to FIGS. 11A to 11E.

Figures 10A, 10B:
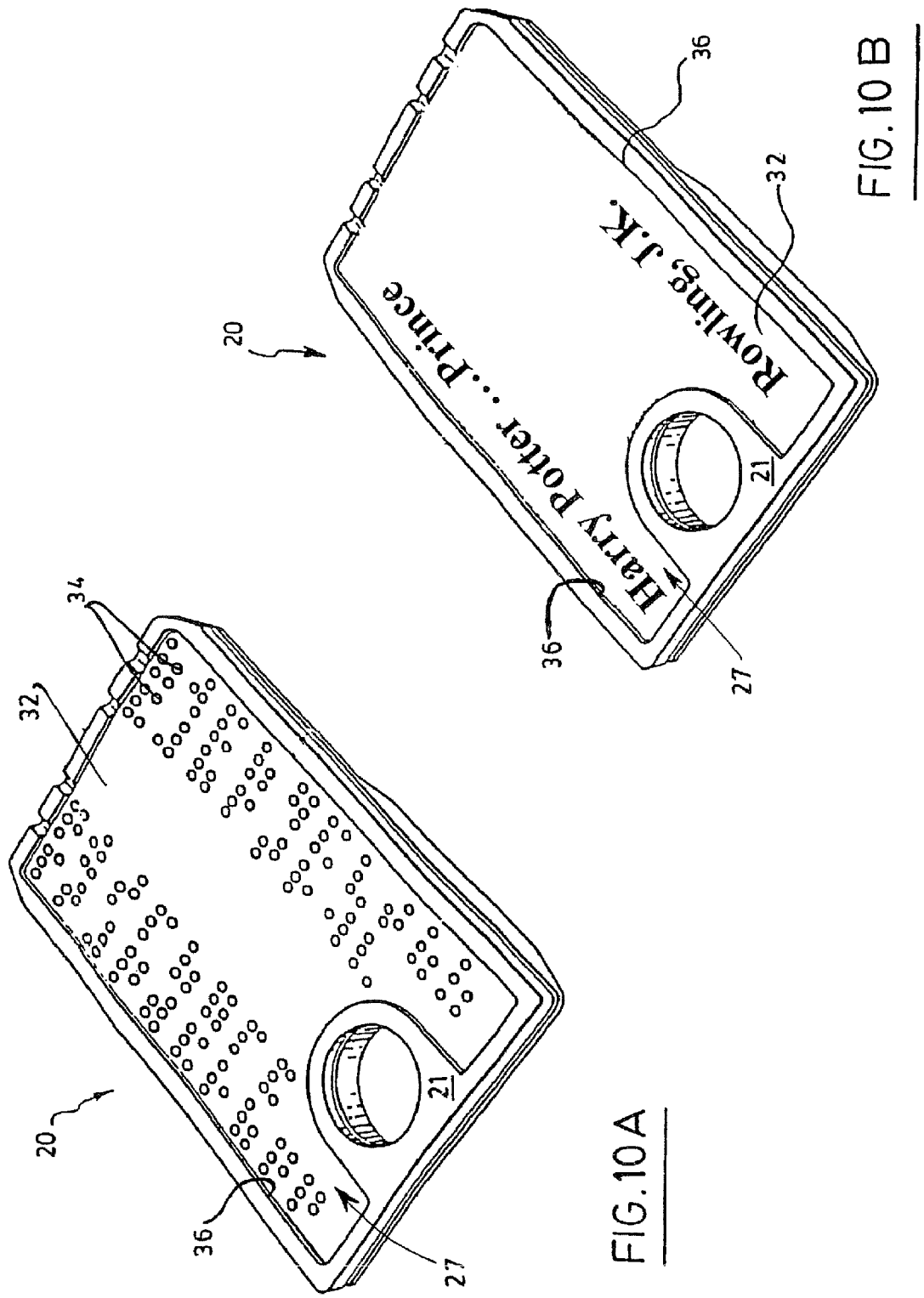
FIG. 10A is a perspective top view of a cartridge showing a label having Braille markings, according to an embodiment of the invention.
FIG. 10B is a perspective top view of a cartridge showing a label having print markings, according to an embodiment of the invention.

The cartridge 20 is preferably provided with an identification label 32 identifying the digital audio content of the book or other recording stored therein, such as seen in FIGS. 10A and 10B. The label 32 preferably includes Braille markings 34 for the convenience of visually impaired users, as illustrated in FIG. 10A, and may include printed text, as shown in FIG. 10B. The top side 27 of the casing 21 preferably includes a ridge 36 defining a label receiving area for receiving the label. This ridge 36 prevents the raised Braille dots 34 from being damaged or erased when cartridges 20 are stacked and/or rubbed against each other.

Referring to FIGS. 12A to 13B, there is shown a digital audio book player 38 for receiving a cartridge according to the present invention. The player 38 includes a receptacle 40 for receiving the cartridge, which is provided in the front of the player 38 in the illustrated embodiment. The receptacle may alternatively be provided in side walls or on top of the player 38, and the cartridge need not be enclosed on all sides by the player when inserted therein. The player is provided with the necessary electronic components and an appropriate user interface 42.

The present invention facilitates the insertion of the cartridge for all members of the print-disabled user group, while making it virtually impossible to perform such an insertion incorrectly.

The receptacle 40 of the audio book player 38 includes an open front end 37a, a closed back end 37b opposite the open front end 37a, a first lateral surface 37c, a second lateral surface 37d opposite the first lateral surface 37c, an upper surface 39b, and a lower surface 39a opposite the upper surface 39b. The closed back end 37b of the receptacle 40 includes a mating connector 48 for connecting to the connector 22 of the digital storage device 29 of the cartridge 20 (as best seen in FIG. 12A (in phantom line) and in FIG. 13B). A section of the lower surface 39a proximate the open front end 37a of the receptacle 40 is sloped and serves as an elevated ramp 39c (as best seen FIG. 12A). The elevated ramp 39c is angled so that when the cartridge 20 rests on the sloped surface 30 of the casing 21, the bottom side 25 at the front end 24 of the casing 21 is inclined at an angle substantially matching an angle of the ramp 39c of the receptacle 40 of the player 38 and rests on the elevated ramp 39c for slidedly inserting the cartridge 20 into the receptacle 40. In the embodiment of the player 38 shown in the accompanying drawings and more particularly in FIGS. 13A and 13B, the player 38 is further provided with a retractable handle 47, which has a form matching the lower surface 39a of the receptacle so as not to interfere with the insertion of the cartridge 20. Of course, it is understood that the player need not have a handle or that the handle of the player may be found in a convenient out-of-the-way area of the player.

Firstly, the receptacle 40 in the player 38 has a corresponding shape so that the cartridge 20 will fit in this receptacle 40 only if it is oriented correctly. In the embodiment shown, each of the first and second lateral sides 45a and 45b have a bevelled lateral edge 44a and 44b which extends partway along the bottom side 25 of the casing 21 (see FIGS. 1 to 8, and more particularly FIGS. 1, 2, 4, 5, 6 and 8). The beveling along the bottom sides of the casing of the cartridge advantageously facilitates picking up the cartridge when placed on a smooth surface. Alternatively, at least one of the first and second lateral sides 45a and 45b of the cartridge 20 may have a bevelled lateral edge either along the top side 27 or the bottom side 25 of the casing 21, as long as the cartridge is not horizontally symmetric making the proper orientation of the cartridge 20 difficult to determine. In the preferred embodiment, the bevelled lateral edges 44a and 44b do not extend along the entire length of the cartridge 20, which presents a square or otherwise protruding form 46 at the back end 26 of the cartridge 20 serving as abutment means (see FIGS. 2, 4, 5, and 6) thereby preventing the cartridge from being inserted incorrectly into the receptacle 40—back end 26 first. The casing may also be tapered laterally to facilitate insertion into the receptacle, for example the first and second lateral sides may be tapered from the back end to the front end of the casing or have tapered corners 44c at the front end (see FIGS. 1 to 8). The shape of the receptacle 40 of the player 38 is of course adapted to the cross-sectional shape of the casing 21 of the cartridge 20. The first lateral surface 37c and the second lateral surface 37d of the receptacle match the bevelled lateral edges 44a and 44b of the casing 21 for correct guided insertion of the casing into the receptacle and provide abutment means for impeding further forced insertion of the cartridge 20 into the receptacle 40 when the cartridge is inserted correctly. To guide the cartridge into the receptacle, the receptacle may further have a funnel shape. In addition, the upper surface 39b proximate the open front end 37a of the receptacle may be recessed with respect to the lower surface 39a. Moreover, the upper surface 39b proximate the open front end may have an upper edge that is sloped to guide the front end of the cartridge into the receptacle.

Figure 11A:
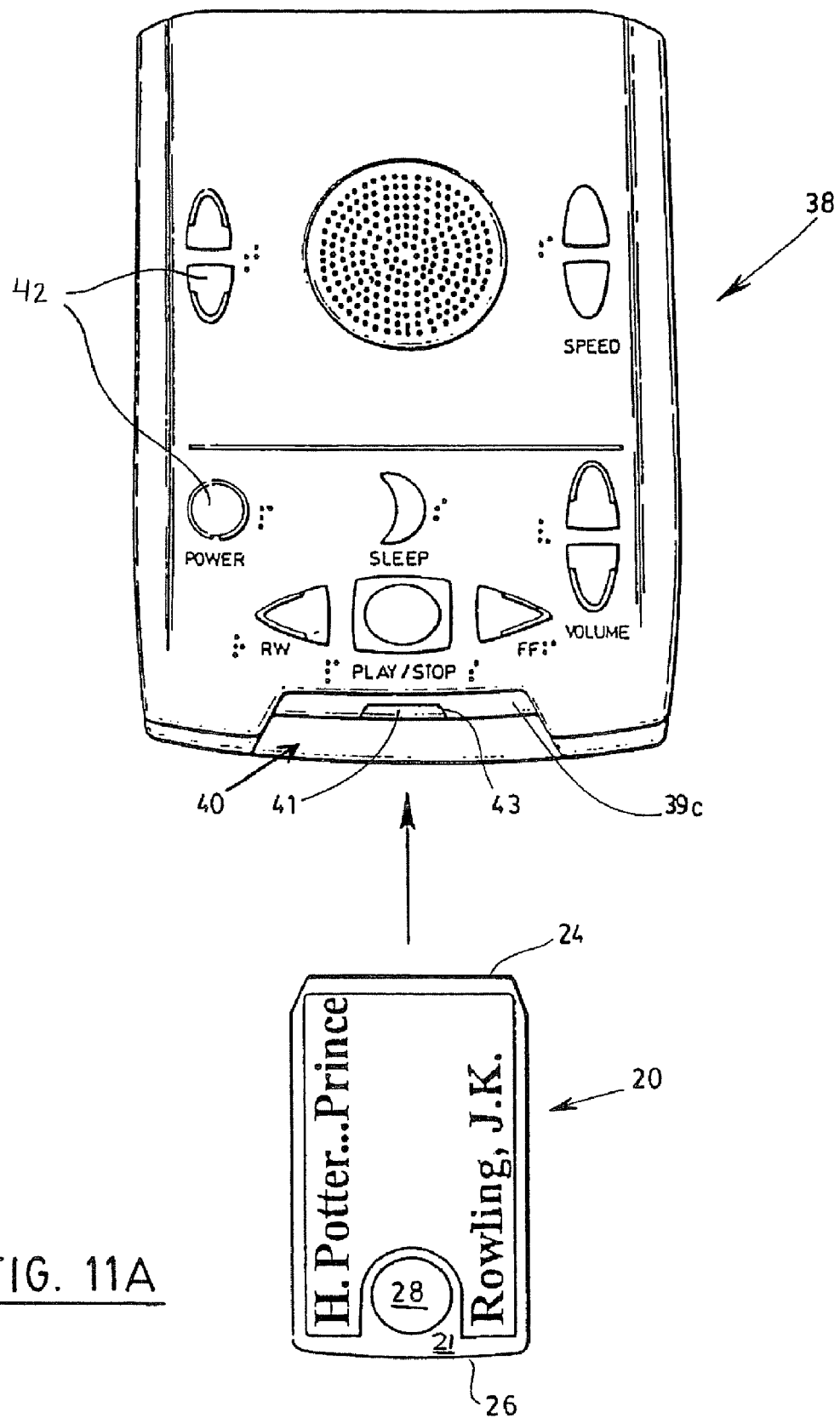
FIG. 11A is a top view of a cartridge and a player, illustrating the cartridge loading aspect of the present invention.
Figure 11B:
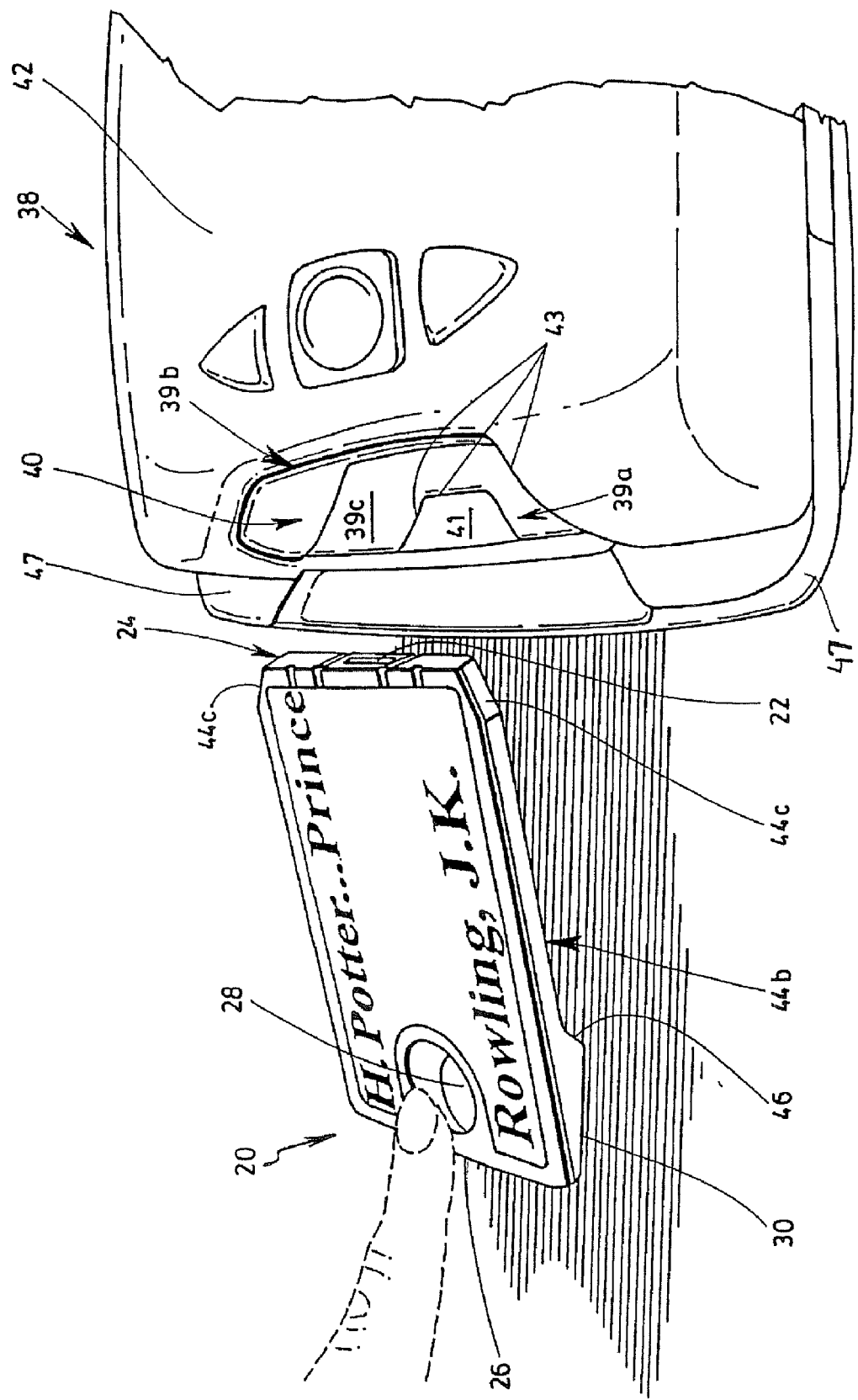
FIG. 11B is a perspective partial view of a cartridge and player, illustrating the cartridge loading aspect of the present invention.
Figure 11C:
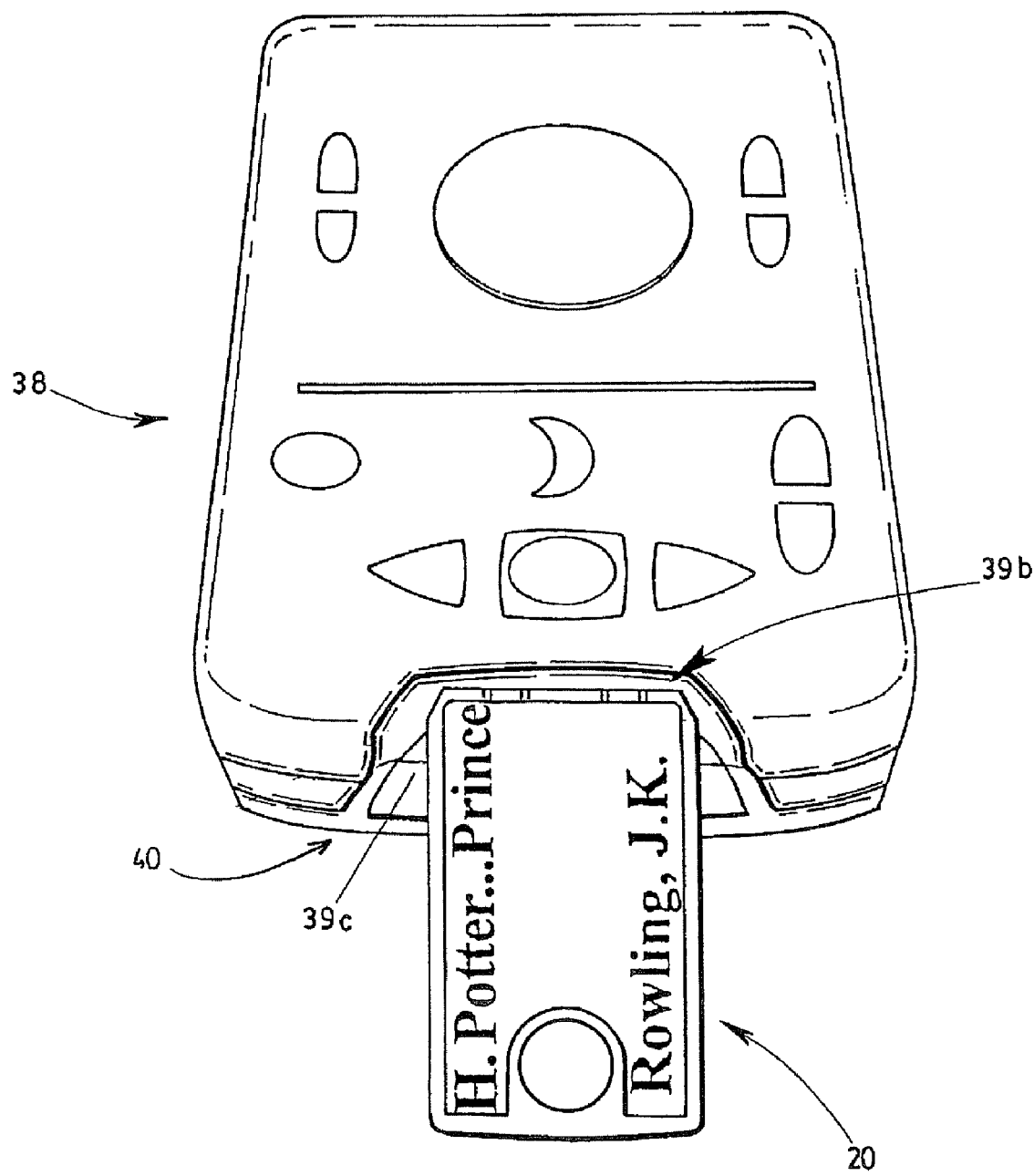
FIG. 11C is a perspective view of a cartridge and a player, illustrating the cartridge loading aspect of the present invention.
Figure 11D:
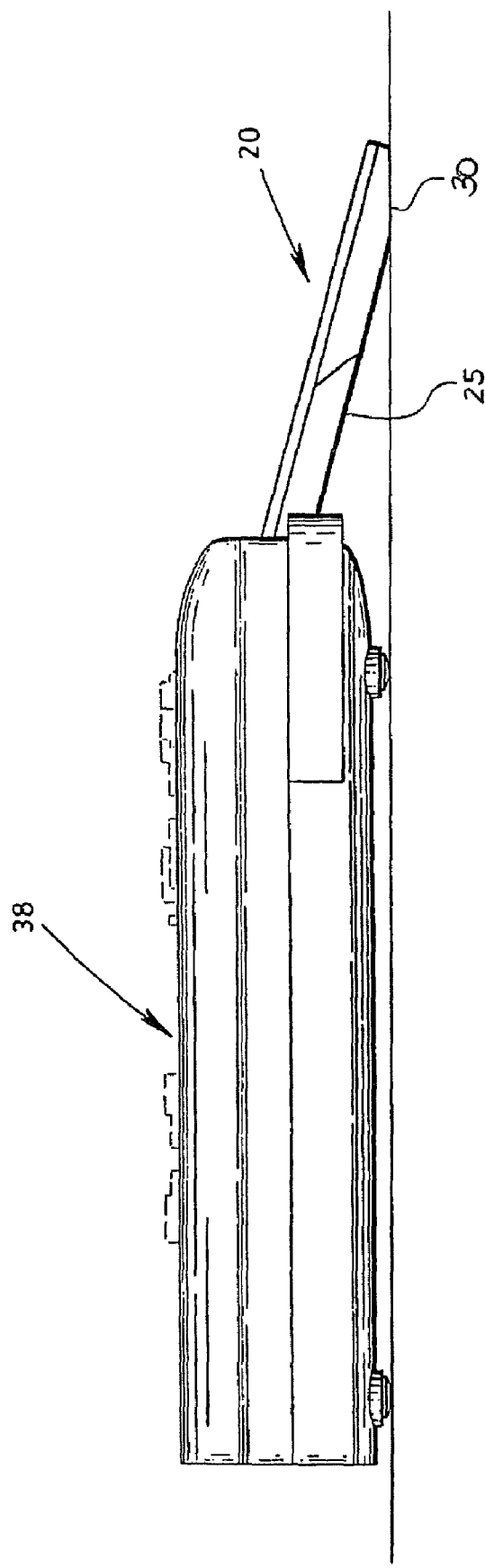
FIG. 11D is a side view of a cartridge and player, illustrating the cartridge loading aspect of the present invention.
Figure 11E:
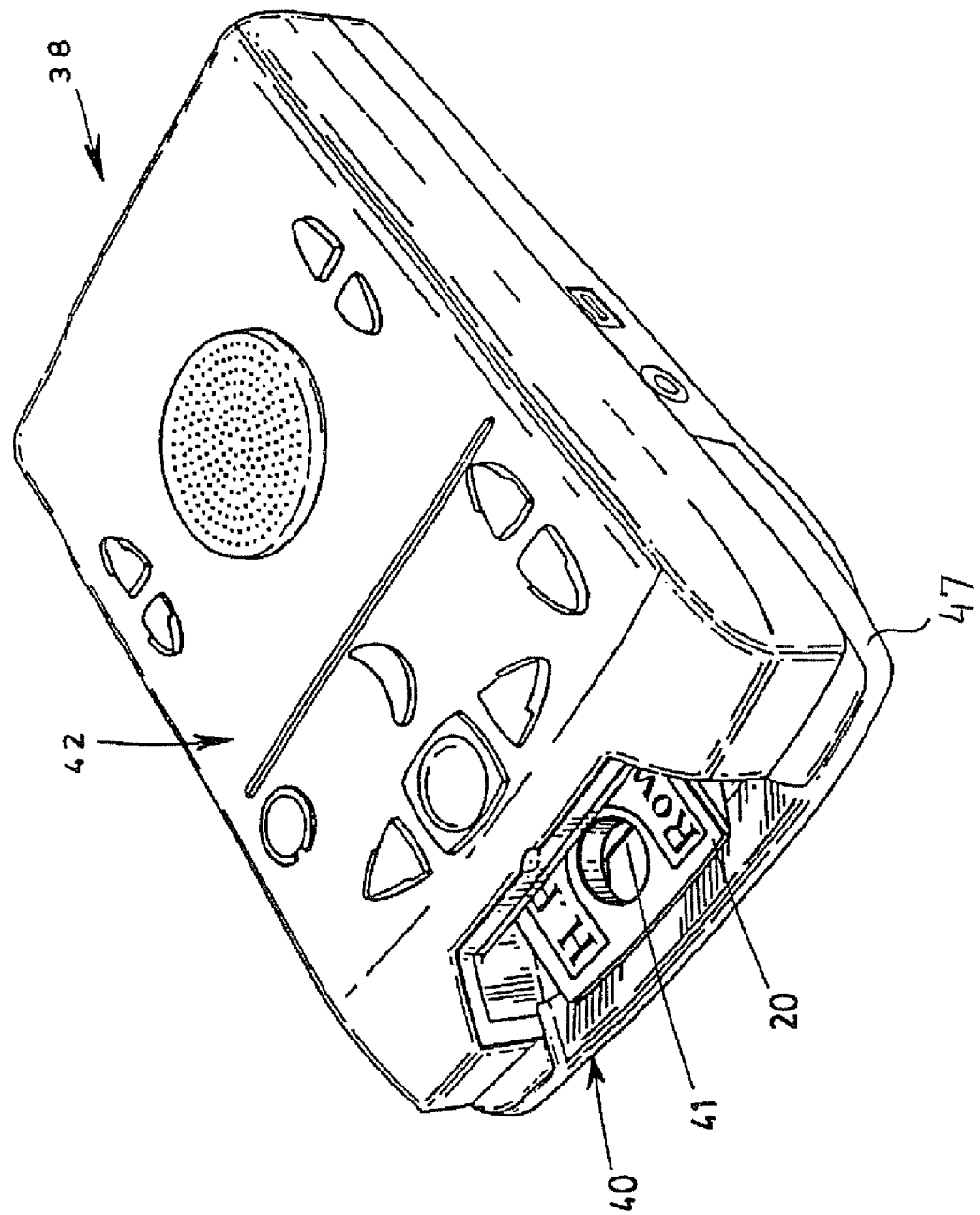
FIG. 11E is a perspective view of a cartridge and player with the cartridge fully loaded into a receptacle of the player, illustrating the cartridge loading aspect of the present invention.
Figure 12:
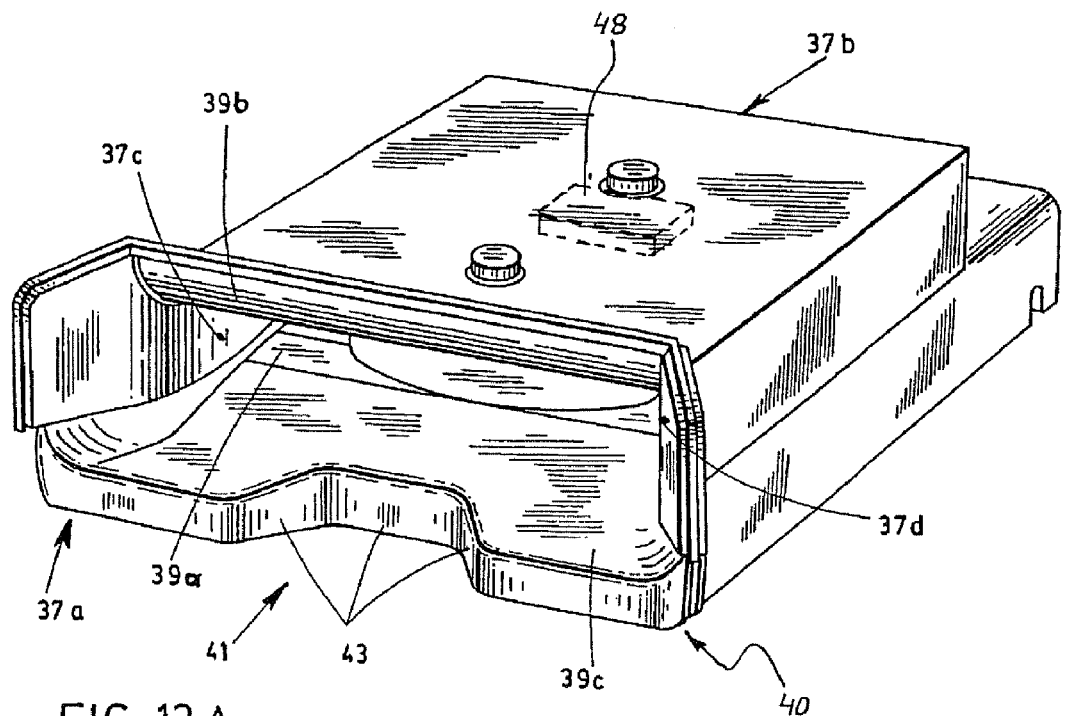
FIG. 12A is a perspective view of a receptacle of a player, according to an embodiment of the invention, with the mating connector shown in phantom line.
FIG. 12B is a perspective view of a cartridge fully inserted into the receptacle of FIG. 12A.
Figure 12:
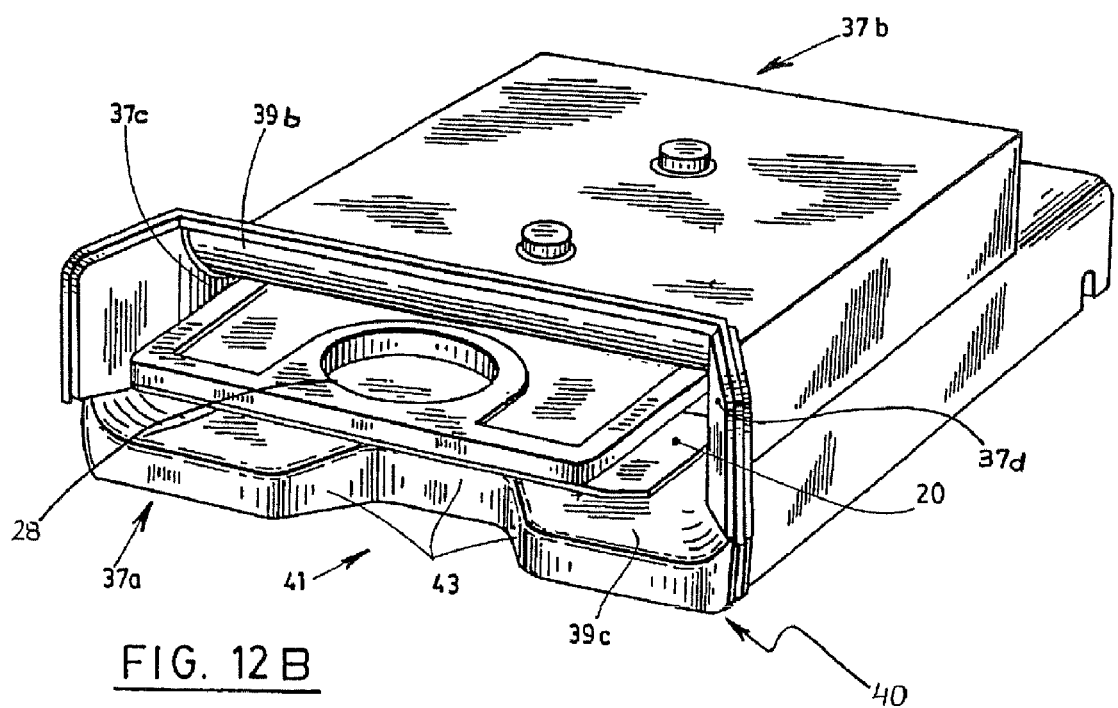

Referring to FIGS. 11A to 13B, in accordance with another aspect of the invention, the receptacle 40 of the player 38 may be provided with a recess, an indentation 41 in its lower surface 39a which may be enclosed on all sides as seen in FIG. 13B, or open on one side as seen in FIG. 12A. The indentation 41 is positioned so as to be generally vertically aligned with the hole 28 of the cartridge 20 when the cartridge 20 is inserted into the player 38. In this manner, the indentation can receive a tool used by print-disabled users, such as a mouthstick or footstick, that is inserted through the hole 28 and the walls 43 of the indentation 41 can provide leverage for the tool to facilitate the removal of the cartridge 20.

Referring to FIGS. 11A to 11E, there is illustrated one method of inserting a cartridge 20 in accordance with the preferred embodiment of the invention in a player 38. This method is particularly advantageous for users with little or no finger dexterity or mouthstick users.

In FIG. 11A, the user positions the cartridge 20 on a surface, such as a table, with its front end 24 facing the receptacle 40 of the player 38. The hole 28 also helps to easily orient the cartridge by easily determining the front and back ends (24 and 26) of the casing 21 of the cartridge 20.

The user then presses on the back end 26 of the cartridge 20, using a finger (as shown) or mouthstick. The cartridge will rest on its sloped surface 30, elevating its front end 24. Preferably, the bevel angle of the sloped surface 30, the length of the cartridge 20 and the position of the receptacle 40 are collectively selected so that the front end 24 of the casing 21 of the cartridge 20 will be naturally aligned with the receptacle 40 in the situation shown in FIG. 11B.

As shown in FIGS. 11B, 11C and 11D, the cartridge can be pushed by the user so that its front end 24 enters the receptacle 40. The receptacle 40 preferably presents a lower surface 48 defining an elevated ramp 39c adapted to receive the front end 24 of the casing 21 of the cartridge 20 so that when the casing 21 is angled along the sloped surface 30 of the back end 26 thereof, its front end 24 rests easily on the receptacle 40 of the player 38. In this manner, a mouthstick user may position the cartridge at the entrance of the receptacle, for example using the mouthstick inserted through the hole 28 in the cartridge 20, remove the mouthstick while the cartridge stays in place, and then use the mouthstick to push the cartridge from the rear to insert it inside the receptacle without the cartridge falling off the elevated ramp 39c of the receptacle. The receiving dock is preferably shaped so that it forms a funnel facilitating entry of the cartridge therein. Also preferably, once the cartridge 20 has been inserted and the connector 20 connected to the mating connector of the receptacle, the player announces the title of the book automatically to indicate that the insertion has been successfully completed.

Referring to FIG. 11E, the cartridge 20 after insertion in the player is shown. Advantageously, the back end 26 of the cartridge with the hole 28 may project out of the receptacle 40 so that a user can simply insert a finger or mouthstick in the hole 28 to pull the cartridge out of the player 38.

Of course, numerous modifications could be made to the embodiments described above without departing from the scope of the present invention.

The invention claimed is:

1. A cartridge for use by print-disabled users to play digital audio content, said cartridge comprising:
   a random-access digital storage device storing said digital audio content, said digital storage device having a connector providing access to said digital audio content; and
   a casing permanently housing the digital storage device and having a form facilitating handling of said cartridge by said print-disabled users, said casing having dimensions comparable to dimensions of a standard compact audio cassette and having:
   a front end,
   a back end opposite said front end,
   a first lateral side,
   a second lateral side opposite said first lateral side,
   a top side, and
   a bottom side opposite said top side,
   said casing allowing access to the connector of the digital storage device.

2. The cartridge according to claim 1, wherein the digital storage device comprises flash memory.

3. The cartridge according to claim 1, wherein the connector is a USB connector recessed into the front end of the casing.

4. The cartridge according to claim 1, wherein the casing has a hole extending from the top side through to the bottom side, said hole being located proximate the back end of the casing.

5. The cartridge according to claim 1, wherein the back end of the casing comprises a sloped surface on the bottom side of the casing.

6. The cartridge according to claim 1, wherein at least one of the first lateral side and the second lateral side comprises a bevelled lateral edge extending part way along the bottom side or top side of the casing.

7. The cartridge according to claim 1, wherein the front end of the casing is tapered laterally.

8. The cartridge according to claim 1, wherein said top side is provided with a ridge thereon defining a label-receiving area, said label-receiving area being adapted to receive a label associated with said digital audio content.

9. The cartridge according to claim 1, wherein the dimensions of the casing are approximately 9.5 cm by 5.7 cm by 1.0 cm.

10. A cartridge for use by print-disabled users to play digital audio content, said cartridge comprising:
    a random-access digital storage device storing said digital audio content, said digital storage device having a connector providing access to said digital audio content; and
    a casing permanently housing the digital storage device and having a form facilitating handling of said cartridge by said print-disabled users, said casing allowing access to the connector of the digital storage device, said casing comprising:
    a top side;
    a bottom side opposite said top side;
    a first lateral side;
    a second lateral side opposite said first lateral side, at least one of said first side second sides comprising a bevelled lateral edge which extends part way along the bottom side or top side of the casing;
    a front end; and
    a back end opposite said front end, said back end comprising a sloped surface on the bottom side of the casing;
    said casing having a hole extending from the top side through to the bottom side, said hole being located proximate the back end of the casing.

11. The cartridge according to claim 10, wherein the front end of the casing is tapered laterally.

12. The cartridge according to claim 10, wherein said top side is provided with a ridge thereon defining a label-receiving area, said label-receiving area being adapted to receive a label associated with said digital audio content.

13. A cartridge for use by print-disabled users to play digital audio content in an audio book player having a receptacle for receiving the cartridge, the receptacle having a lower surface defining an elevated ramp, said cartridge comprising:
    a random-access digital storage device storing said digital audio content, said digital storage device having a connector providing access to said digital audio content; and
    a casing permanently housing the digital storage device and having a form facilitating handling of said cartridge by said print-disabled users, said casing having dimensions comparable to dimensions of a standard compact audio cassette and having:
    a front end,
    a back end opposite said front end,
    a first lateral side,
    a second lateral side opposite said first lateral side,
    a top side, and
    a bottom side opposite said top side,
    said casing allowing access to the connector of the digital storage device at the front end thereof, wherein the back end of the casing comprises a sloped surface on the bottom side of the casing, said sloped surface being angled so that when the cartridge rests on the sloped surface of the casing, the bottom side at the front end of the casing rests on the elevated ramp for slidably inserting the cartridge into the receptacle.

14. The cartridge according to claim 13, wherein the sloped surface of the casing is inclined at an angle substantially matching an angle of the elevated ramp of the receptacle of the audio book player.

15. The cartridge according to claim 13, wherein at least one of the first lateral side and the second lateral side comprises a bevelled lateral edge which extends part way along the bottom or top side of the casing.

16. The cartridge according to claim 13, wherein the casing has a hole extending from the top side through to the bottom side, said hole being located proximate the back end of the casing.

17. The cartridge according to claim 13, wherein the front end of the casing is tapered laterally.

18. The cartridge according to claim 13, wherein said top side is provided with a ridge thereon defining a label-receiving area, said label-receiving area being adapted to receive a label associated with said digital audio content.

19. An audio book player for playing digital audio content from a cartridge for use by print-disabled users, the cartridge comprising a random-access digital storage device storing the digital audio content, the digital storage device having a connector providing access to the digital audio content, and a casing permanently housing the digital storage device and having a form facilitating handling of said cartridge by said print-disabled users, the casing having a front end, a back end opposite the front end, a first side, a second side opposite the first side, a top side and a bottom side opposite the top side, wherein the back end of the casing comprises a sloped surface on the bottom side of the casing, the casing allowing access to the connector of the digital storage device, said audio book player comprising:
    a receptacle for receiving the cartridge, said receptacle comprising:
    an open front end;
    a closed back end opposite said open front end, said closed back end comprising a mating connector for connecting to the connector of the digital storage device of the cartridge;
    a first lateral surface;
    a second lateral surface opposite said first lateral surface;
    an upper surface; and
    a lower surface opposite said upper surface, said lower surface defining an elevated ramp, said elevated ramp being angled and of a height so that when the cartridge rests on the sloped surface of the casing, the bottom side at the front end of the casing rests on the elevated ramp of the receptacle of the audio book player for slidably inserting the cartridge into the receptacle.

20. The cartridge according to claim 19, wherein the elevated ramp is inclined at an angle substantially matching an angle of the sloped surface of the casing.

21. The audio book player according to claim 19, wherein the receptacle comprises a funnel shape for guiding the cartridge therein.

22. The audio book player according to claim 19, wherein the upper surface proximate the open front end is recessed with respect to the lower surface and comprises an upper edge that is sloped to guide the front end of the cartridge into the receptacle.

23. The audio book player according to claim 19, wherein the first lateral surface and second lateral surface of the receptacle receivingly match bevelled lateral edges of the cartridge.

24. The audio book player according to claim 19, wherein the receptacle comprises abutment means for impeding further insertion of the cartridge into the receptacle.

25. The audio book player according to claim 19, wherein the lower surface proximate the open front end comprises a recess therein for receiving a tool used by print-disabled users.

* * * * *